3,453,308
ARYLOXYALKYLAMINOETHYL THIOSULFATE COMPOUNDS
Roger D. Westland, Ann Arbor, Mich., assignor to Parke, Davis & Company, Detroit, Mich., a corporation of Michigan
No Drawing. Filed Oct. 14, 1966, Ser. No. 586,656
Int. Cl. C07c *119/00;* A61k *27/00*
U.S. Cl. 260—453                    6 Claims

ABSTRACT OF THE DISCLOSURE

Aryloxyalkylaminoethyl thiosulfates, in which the aryl group is phenyl, mono- or di-lower alkyl-phenyl, mono- or di-chlorophenyl, 2-methoxy-4-ethylphenyl,3-methyl-4-methylthiophenyl, mono-lower alkoxy-phenyl, nitrophenyl, or trifluoromethylphenyl, and salts thereof, which are useful as antiradiation agents; and their production by (a) reacting a corresponding aryloxyalkyl halide compound with an alkali metal salt of S-2-aminoethyl thiosulfate, (b) reacting a corresponding 2-[(aryloxyalkyl)amino]ethyl disulfide compound with a salt of sulfurous acid in the presence of an oxidizing agent, (c) reacting a corresponding aryloxyalkylaminoethyl bromide or a mineral acid salt thereof with a thiosulfate salt in an aqueous solvent medium, and (d) reacting a corresponding 1-(aryloxyalkyl)aziridine with thiosulfuric acid or a salt thereof.

SUMMARY AND DETAILED DESCRIPTION

The present invention relates to new organic thiosulfate compounds and to methods for their production. More particularly, the invention relates to new aminoethyl thiosulfate compounds, having in the free acid form the formula, $$R_1—O—(CH_2)_n—NH—CH_2CH_2—S—SO_3H$$

I and to pharmaceutically-acceptable salts thereof; where $R_1$ represents an unsubstituted phenyl radical, a mono- or di-lower alkyl-substituted phenyl radical, a mono- or di-chlorophenyl radical, a 2-methoxy-4-ethylphenyl radical, a 3-methyl-4-methylthiophenyl radical, or a mono-substituted phenyl radical in which the substituent is one of the following: lower alkoxy, nitro, and trifluoromethyl; and $n$ is a positive integer having a value of 4, 5, or 6.

In accordance with the invention, aminoethyl thiosulfate compounds having the foregoing formula are produced by reacting an alkyl halide compound, having the formula, $$R_1—O—(CH_2)_n—X$$

II with an alkali metal salt of S-2-aminoethyl thiosulfate, said salt having the formula, $$H_2N—CH_2CH_2—S—SO_3^-M^+$$

III where M represents an alkali metal, preferably sodium, X is chlorine or bromine, and $R_1$ and $n$ have the aforementioned significance. The reaction is normally carried out in a solvent. Suitable solvents for this purpose include water; lower alkanols, such as methanol, ethanol, and isopropyl alcohol; ethers, such as dioxane, tetrahydrofuran, and 1,2-dimethoxyethane; and tertiary amides, such as N,N-dimethylformamide; as well as mixtures of these. A preferred solvent is 95% ethanol. The temperature of the reaction is not critical and may be varied over a wide range from room temperature to about 150° C. It is most convenient to carry out the reaction at the reflux temperature of the reaction mixture. The duration of the reaction is likewise not critical and will vary widely from several hours to several days, depending upon the particular reactants and temperature employed. At the reflux temperature, the reaction is normally complete in about 15–20 hours. While equivalent quantities of reactants may be employed, it is preferable to use a moderate excess of the alkali metal salt of S-2-aminoethyl thiosulfate to insure complete reaction.

The alkyl halide compounds having Formula II above that are used as starting materials in the foregoing procedure can be prepared in different ways, as described in greater detail hereinafter. In general, these starting materials are obtained from the reaction of a phenol compound having the formula $$R_1—OH$$

IV with an alkylene dihalide compound having the formula $$X—(CH_2)_n—X$$

V in the presence of a base; where $R_1$, X, and $n$ are as previously defined.

Also in accordance with the invention, aminoethyl thiosulfate compounds having Formula I and salts thereof are produced by the reaction of a disulfide compound having the formula $$[R_1—O—(CH_2)_n—NH—CH_2CH_2—S]_2$$

VI or a mineral acid salt thereof, with a salt of sulfurous acid in the presence of an oxidizing agent in an unreactive solvent medium; where $R_1$ and $n$ are as defined previously. Salts of sulfurous acid that may be used in the reaction include ammonium sulfite, ammonium bisulfite, alkali metal sulfites, alkali metal bisulfites, alkaline earth metal sulfites, and alkaline earth metal bisulfites. When an alkali metal salt of sulfurous acid is employed, an alkali metal bisulfite is preferred over an alkali metal sulfite. The highly preferred sulfurous acid salt is freshly-prepared ammonium sulfite. Oxidizing agents that may be used are air, oxygen, cupric ion, iodosobenzoate ion, and tetrathionate ion. The sulfurous acid salt employed in the reaction also can function as the required oxidizing agent, in which case an additional oxidizing agent is not required. The preferred oxidizing agent, however, is air, and the reaction is most conveniently carried out by bubbling air through the reaction mixture containing the disulfide compound and salt of sulfurous acid until oxidation is complete. Solvents that may be employed in the reaction are water and lower alkanols, such as methanol, ethanol, and isopropyl alcohol, as well as mixtures of these. A preferred solvent is aqueous methanol. The temperature of the reaction is not critical and may be varied. For convenience, with the use of air as the oxidizing agent, the reaction can readily be carried out at room temperature. The duration of the reaction is likewise not critical, and may be varied from about 5 hours to 48 hours, depending on the method of oxidation employed. When air is used as the oxidizing agent as described above, the oxidation is normally complete after a period of 10–20 hours. To insure complete reaction, the chosen salt of sulfurous acid is employed in large excess, that is, approximately 10 to 15 moles or more of sulfurous acid salt is used for each mole of disulfide compound. The oxidizing agent employed is added in an amount sufficient to effect complete oxidation.

When ammonium sulfite is used in the foregoing reaction, the product is obtained in the free acid form, that is, a compound having Formula I. When an alkali metal bisulfite is employed, the product obtained is an alkali metal salt of the aminoethyl thiosulfate compound having Formula I. In the latter case, it is desirable to neutralize the excess alkali metal bisulfite with the corresponding alkali metal hydroxide prior to isolation of the alkali metal salt.

The disulfide compounds having Formula VI above that are used as starting materials in the foregoing process are prepared by the oxidation, for example, by reaction with iodine in an alkaline medium, of the corresponding thiol compound, having the formula $$R_1-O-(CH_2)_n-NH-CH_2CH_2-SH$$
VII or a mineral acid salt thereof; where $R_1$ and $n$ have the same meaning as previously given. The mineral acid salts of the disulfides, which may also be used as starting materials, are prepared by reacting the disulfide with an equivalent amount of mineral acid in an unreactive solvent. The thiol compounds of Formula VII and mineral acid salts thereof can be prepared by reacting an amine compound having the formula $$R_1-O-(CH_2)_n-NH_2$$
VIII with ethyl 2-mercaptoethyl carbonate and isolating the resulting product directly or in mineral acid salt form by treatment with a mineral acid, such as hydrochloric acid.

Further in accordance with the invention, aminoethyl thiosulfate compounds having Formula I or salts thereof are produced by reacting an aminoethyl bromide compound having the formula $$R_1-O-(CH_2)_n-NH-CH_2CH_2-Br$$
IX or a mineral acid salt thereof with a thiosulfate salt in an aqueous solvent medium; where $R_1$ and $n$ have the aforementioned significance. In this reaction it is preferable to employ the hydrochloride salt of the aminoethyl bromide compound as starting material, in which case the product is isolated in the free acid form having Formula I. Thiosulfate salts that may be used in this reaction include alkali metal thiosulfates, ammonium thiosulfate, alkaline earth metal thiosulfates, and thallous thiosulfate. The preferred thiosulfate salt is sodium thiosulfate because of its ready availability and ease of use. The solvent medium used for this reaction may be water alone or an aqueous mixture of a lower alkanol, such as methanol, ethanol, or isopropyl alcohol. The temperature of the reaction is not critical; it is most convenient to carry out the reaction at or near the reflux temperature of the reaction mixture. The duration of the reaction is likewise not critical; at the reflux temperature it is normally complete after a period of from about 30 minutes to several hours. The completion of the reaction can be determined by acidifying an aliquot of the reaction mixture with mineral acid; failure of sulfur to precipitate indicates that the reaction is essentially complete. It is preferable to employ equivalent quantities of reactants, although a slight excess of either is not harmful. When an excess of sodium thiosulfate is used, the foregoing test for completion of the reaction cannot be used. The product of the reaction can be isolated by cooling or concentration of the mixture.

The aminoethyl bromide starting material is prepared by reacting an amine compound having Formula VIII above with ethylene oxide and then treating the aminoethanol product, having the formula $$R_1-O-(CH_2)_n-NH-CH_2CH_2-OH$$
X with dibromotriphenoxyphosphorane. The preferred hydrochloride salt starting material is then obtained by reacting the aminoethyl bromide compound with an equivalent amount of hydrogen chloride in an unreactive solvent medium.

Further yet in accordance with the invention aminoethyl thiosulfate compounds having Formula I are produced by reacting an aziridine compound having the formula

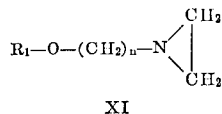
XI with thiosulfuric acid or a salt thereof; where $R_1$ and $n$ are as previously defined. Suitable salts of thiosulfuric acid that may be used in this reaction are alkali metal thiosulfates, such as sodium thiosulfate, alkaline earth metal thiosulfates, ammonium thiosulfate, and thallous thiosulfate. The reaction is carried out in an unreactive solvent medium, which will vary depending on the thiosulfate reactant used. Suitable solvents for use with thiosulfuric acid are water; lower alkanols, such as methanol and ethanol; ethers, such as diethyl ether, tetrahydrofuran, and dioxane; and lower aliphatic ketones, such as acetone and methyl ethyl ketone; as well as miscible combination of these. The preferred solvent for use with thiosulfuric acid is methanol. Solvents that may be used for the reaction with an alkali metal thiosulfate, an alkaline earth metal thiosulfate, or thallous thiosulfate are water alone or mixtures of water with any of the following: lower alkanols, dioxane, tetrahydrofuran, 1,2-dimethoxyethane, dimethylsulfoxide, acetone, and methyl ethyl ketone. The preferred solvent is water. In the reaction with ammonium thiosulfate the following solvents may be used: water; lower alkanols, such as methanol and ethanol; ethers, such as diethyl ether, dioxane, and tetrahydrofuran; dimethylsulfoxide; and aromatic hydrocarbons, such as benzene and toluene; as well as miscible combinations of these. The preferred solvent for use with ammonium thiosulfate is methanol.

When an alkali metal thiosulfate, an alkaline earth metal thiosulfate, or thallous thiosulfate is used in the foregoing reaction, sufficient acid must be added to the reaction mixture to maintain neutrality (pH about 7–9). In the usual case, a molar equivalent of any of the following acids will be satisfactory for this purpose: hydrochloric acid, sulfuric acid, nitric acid, perchloric acid, formic acid and acetic acid. Without the acidification step, the reaction will be strongly inhibited by the base that is formed as a secondary product of the reaction. The acidification step is not required when ammonium thiosulfate is used, since the ammonia that is formed as a by-product is not sufficiently basic to inhibit the reaction and may readily be removed from the reaction mixture by heating.

When free thiosulfuric acid is used in this reaction, care must be taken in the preparation and handling of this reactant because of its extreme instability. Free thiosulfuric acid may be prepared by the metathetical reaction of sodium thiosulfate and hydrochloric acid at $-78°$ C. in diethyl ether, or, preferably, by the metathetical reaction of ammonium thiosulfate and sulfuric acid in methanol at $-40°$ C. or below, as described in greater detail hereinafter. For use in the reaction with the aziridine compound of Formula XI above, the preferred methanolic solution of thiosulfuric acid should be prepared just prior to use, since the acid will decompose appreciably if kept longer than 4–6 hours even at a temperature of $-30°$ C. The reaction with the aziridine compound is then best carried out by slowly adding a cold ($-20°$ C. or below) solution of the aziridine starting material to the freshly prepared thiosulfuric acid solution, maintained at about $-40°$ C., allowing the resulting reaction mixture to warm to room temperature, and then isolating the reaction product after a period of about 10 to 20 minutes by adding a suitable precipitating solvent, such as diethyl ether, cooling, and filtering. Longer reaction periods and higher temperatures are neither necessary nor desirable. It is preferable to employ equivalent quantities of the aziridine and thiosulfuric acid, although a slight excess of thiosulfuric acid may be used to insure complete reaction.

The conditions for the reaction with a thiosulfate salt are the following. With an alkali metal thiosulfate, an alkaline earth metal thiosulfate, or thallous thiosulfate, the reaction is conveniently carried out at room temperature for a period of about one to four hours. The temperature and duration in these cases are not especially critical, however, and may be varied widely. When ammonium thiosulfate is used, the reaction is best carried out at the reflux temperature of the reaction mixture for a period of about 3 to 4 hours. Other temperatures within the range of 20 to 120° C. and other reaction times, from one hour to 12 hours and longer, may also be used, depending somewhat on the aziridine starting material and solvent chosen. While equivalent quantities of the reactants may be employed in the reaction with any of these thiosulfate salts, to insure complete reaction it is preferable to use a slight excess of the thiosulfate salt.

The aziridine compounds having Formula XI above that are used as starting materials in the foregoing reaction are prepared by reacting an alkyl halide compound having Formula II above with ethyleneimine in the presence of a base.

The compounds of the invention are new chemical compounds that are useful as pharmacological agents. They are antiradiation agents that are active in protecting against the effects of exposure to X-ray or gamma ray radiation. They are active upon oral or parenteral administration. Parenteral administration is preferred.

The compounds of the invention can be used either in the free acid form, having Formula I above, or in the form of a pharmaceutically-acceptable salt formed with an alkali metal hydroxide, an alkali metal carbonate, an alkali metal alkoxide, a quaternary ammonium hydroxide, or an alkaline earth metal hydroxide. In the free acid form the compounds of the invention exist as internal salts that may also be represented by the formula

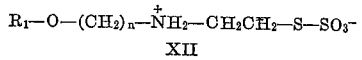

XII where $R_1$ and $n$ are as defined previously. Pharmaceutically-acceptable salts of the aminoethyl thiosulfate compounds of the invention are prepared as described above or by reaction of the selected aminoethyl thiosulfate compound in the free acid form with a dilute solution of an equivalent amount of the selected base in an unreactive solvent, such as water or a lower alkanol. The preferred salts are the salts of an alkali metal, which are preferably prepared by reacting a selected aminoethyl thiosulfate compound in free acid form with an equivalent amount of an alkali metal alkoxide in a lower alkanol solvent.

The invention is illustrated by the following examples:

Example 1

To a solution of 30 g. of sodium S-2-aminoethyl thiosulfate in 200 ml. of 95% ethanol, heated under reflux, is added dropwise 40 g. of 4-bromobutyl m-chlorophenyl ether, and the resulting mixture is headed under reflux overnight. The mixture is concentrated to half-volume, 125 ml. of water is added, and the aqueous solution is made slightly acidic (pH 6) with glacial acetic acid and chilled to precipitate S-2-{[(4-o-chlorophenoxy)butyl]amino}ethyl thiosulfate, which is isolated, dried, and crystallized successively from water and from absolute ethanol; M.P. 158–159° C.

The sodium salt of S-2-{[4-(o-chlorophenoxy)butyl]amono}ethyl thiosulfate is obtained by treating a methanolic solution of 2.0 g. of the free acid at room temperature with an equivalent amount of sodium methoxide, evaporating the resulting mixture to dryness, and crystallizing the solid salt from methanol.

The 4-bromobutyl m-chlorophenyl ether starting material is prepared as follows. A mixture consisting of 90 g. of m-chlorophenol, 302 g. of 1,4-dibromobutane, 95 g. of anhydrous potassium carbonate, and 380 ml. of dry acetone is heated under reflux for 18 hours, cooled, and filtered. The filtrate is evaporated to near-dryness, diluted with 400 ml. of water, and the aqueous mixture is extracted with two 250 ml. portion of ether. The combined ether extracts are washed with water, dried, and distilled to give the desired 4-bromobutyl m-chlorophenyl ether starting material; B.P. 181–187° C./119 mm. Hg.

Example 2

Utilizing the general procedure described in Example 1 above, with applicable minor variations, the following aminoethyl thiosulfate compounds are prepared from the reaction of sodium S-2-aminoethyl thiosulfate with the designated alkyl halide compound.

(a) From the reaction of 54 g. of sodium S-12-aminoethyl thiosulfate with 50 g. of 4-(o-tolyloxy)butyl chloride in the presence of 2 g. of sodium iodide there is obtained S-2-{[4-(o-tolyloxy)butyl]amino}ethyl thiosulfate; M.P. 173–178° C., following crystallization from ethanol.

(b) From the reaction of 43 g. of sodium S-2-aminoethyl thiosulfate with 39.6 g. of 4-(m-tolyloxy)butyl chloride in the presence of 2 g. of sodium iodide there is obtained S-2-{[4-(m-tolyloxy)butyl]amino}ethyl thiosulfate. The precipitated product is purified by washing with water, crystallizing from 95% ethanol, and recrystallizing from water; M.P. 168–170° C.

(c) From the reaction of 50.8 g. of sodium S-2-aminoethyl thiosulfate with 50 g. of 4-(o-chlorophenoxy)butyl briomide there is obtained S-2-{[4-(o-chlorophenoxy)butyl]amino}ethyl thiosulfate; M.P. 165–166° C., following successive crystallizations from acetonitrile and from ethanol.

(d) From the reaction of 47 g. of sodium S-2-aminoethyl thiosulfate with 60 g. of 4-(p-chlorophenoxy)butyl bromide there is obtained S-2-{[4-(p-chlorophenoxy)butyl]amino}ethyl thiosulfate. The reaction mixture is heated under reflux for 68 hours, and the precipitated product that is ultimately obtained is purified by washing with cold water and ethanol, triturating with acetone, and crystallizing from ethanol-N,N-dimethylformamide; M.P. 171–172° C.

(e) From the reaction of 35.8 g. of sodium S-2-aminoethyl thiosulfate with 36.5 g. of 4-(p-nitrophenoxy)butyl bromide there is obtained S-2-{[4-(p-nitrophenoxy)butyl]amino}ethyl thiosulfate; M.P. 157–159° C., following crystallization from ethanol.

(f) From the reaction of 32.2 g. of sodium S-2-aminoethyl thiosulfate with 40 g. of 4-chlorobutyl m-trifluoromethylphenyl ether there is obtained S-2-{[4-(m-trifluoromethylphenoxy)butyl]amino}ethyl thiosulfate; M.P. 190–193° C., following crystallization from ethanol.

(g) From the reaction of sodium S-2-amino-ethyl thiosulfate with 4-(2,3-xylyloxy)butyl bromide there is obtained S-2-{[4-(2,3-xylyloxy)butyl]amino}ethyl ethiosulfate; M.P. 198–200° C., following crystallization from ethanol.

(h) From the reaction of sodium S-2-amino-ethyl thiosulfate with 4-(2,4-xylyloxy)butyl bromide there is obtained S-2-{[4-(2,4-xylyloxy)butyl]amino}ethyl thiosulfate; M.P. 206–208° C., following crystallization from water.

(i) From the reaction of sodium S-2-amino-ethyl thiosulfate with 4-(3,4-xylyloxy)butyl bromide there is obtained S-2-{[4-(3,4-xylyloxy)butyl]amino}ethyl thiosulfate; M.P. 187–189° C., following crystallization from water.

(j) From the reaction of sodium S-2-amino-ethyl thiosulfate with 4-(2,4-dichlorophenoxy)butyl chloride there is obtained S-2-{[4-(2,4 - dichlorophenoxy)butyl]amino} ethyl thiosulfate. The initial precipitated product is washed with water, dried, triturated with ether, and crystallized from ethanol; M.P. 179–181° C.

(k) From the reaction of 53 g. of sodium S-2-aminoethyl thiosulfate with 50 g. of 4-{[4-(methylthio)-m-tolyl]oxy}butyl bromide there is obtained S-2-{[4-{[4-(methylthio)-m-tolyl]oxy}butyl]amino}ethyl thiosulfate; M.P. 174–174° C., following several crystallizations from acetone.

(l) From the reaction of 49.4 g. of sodium S-2-aminoethyl thiosulfate with 50 g. of 6-(o-tolyloxy)hexyl bromide there is obtained S-2-{[6-(o-tolyloxy)hexyl] amino}ethyl thiosulfate; M.P. 181–183° C., following successive crystallizations from ethanol and from acetone.

The sodium salt of S-2-{[6-(o-tolyloxy)hexyl]amino} ethyl thiosulfate is obtained by adding 2.97 g. of the free acid to 10 ml. of 1.0 N aqueous sodium hydroxide and evaporating the resulting solution to dryness under reduced pressure.

The alkyl halide starting materials listed below, which are not readily available, are prepared by reacting the appropriately substituted phenol compound with the appropriate alkylene dihalide compound in the presence of potassium carbonate according to the procedure described in Example 1 above for preparation of 4-bromobutyl m-chlorophenyl ether.

(1) 4-(o-chlorophenoxy)butyl bromide, B.P. 124–133° C./0.4 mm. Hg, from reaction of o-chlorophenol with 1,4-dibromobutane.

(2) 4-chlorobutyl m-trifluoromethylphenyl ether, B.P. 148–158° C./20 mm. Hg, from reaction of m-trifluoromethylphenol with 1-bromo-4-chlorobutane.

(3) 4-(2,3-xylyloxy)butyl bromide, B.P. 113–117° C./0.35 mm. Hg, from reaction of 2,3-xylenol with 1,4-dibromobutane.

(4) 4-(2,4-xylyloxy)butyl bromide, B.P. 122–126° C./1.0 mm. Hg, from reaction of 2,4-xylenol with 1,4-dibromobutane.

(5) 4-(3,4-xylyloxy)butyl bromide, B.P. 142–149° C./1.2–1.6 mm Hg, from reaction of 3,4-xylenol with 1,4-dibromobutane.

(6) 4-{[4-methylthio) - m - tolyl]oxy}butyl bromide, used without distillation, from reaction of 4-methyl-thio-m-cresol with 1,4-dibromobutane.

(7) 6-(o-tolyloxy)hexyl bromide, B.P. 130–143° C./0.3 mm. Hg, from reaction of o-cresol with 1,6-dibromohexane.

The 4-(2,4-dichlorophenoxy)butyl chloride starting material used in (i) above is prepared as follows. To 15.2 g. of lithium aluminum hydride in 1000 ml. of ether is carefully added a solution of 100 g. of γ-(2,4-dichlorophenoxy)butyric acid in 250 ml. of ether and 400 ml. of tetrahydrofuran, and the resulting mixture is heated under reflux for one hour. The mixture is cooled and treated successively with 15 ml. of water, 15 ml. of 20% aqueous sodium hydroxide, and 45 ml. of water. The hydrolyzed mixture is filtered and evaporated to dryness to give an oily residue of 4-(2,4-dichlorophenoxy)-butyl alcohol, which is isolated and used directly in the following step. To a chilled mixture consisting of 91 g. of 4-(2,4-dichlorophenoxy)butyl alcohol, 14 drops of pyridine, and 100 ml. of benzene is added dropwise 55.8 ml. of thionyl chloride, and the reaction mixture is heated under reflux for 1.5 hours, cooled, and poured onto ice. The organic phase is separated, washed with 10% aqueous sodium hydroxide, dried, and evaporated to give the desired 4-(2,4-dichlorophenoxy)-butyl chloride starting material, suitable for use without further purification.

Example 3

To a solution of 29.8 g. of 2-{[4-(p-tolyloxy)-butyl] amino}ethyl disulfide in 500 ml. of ethanol is added an aqueous ammonium sulfite solution (freshly prepared by bubbling 32 g. of sulfur dioxide into 550 ml. of water and neutralizing the resulting solution with ammonium hydroxide), and air is passed through the solution for 20 hours at room temperature. The resulting mixture is evaporated to near-dryness, the residue is treated with 100 ml. of cold water and the solid precipitate of S-2-{[4-(p-tolyloxy)butyl]amino}ethyl thiosulfate that is obtained is isolated, dried, and crystallized successively from ethanol and from acetone; M.P. 180–182° C.

The potassium salt of S-2-{[4-(p-tolyloxy)butyl] amino}ethyl thiosulfate is obtained by treating a methanolic solution of 2.0 g. of the free acid at room temperature with an equivalent of 10% aqueous potassium hydroxide and evaporating the resulting mixture to dryness under reduced pressure.

Utilizing the procedure described above, with the substitution of 30 g. of 2-{[4-(2,6-xylyloxy)butyl]amino} ethyl disulfide for the 2-{[4-(p-tolyloxy)butyl]amino} ethyl disulfide, there is obtained S-2-{[4-(2,6-xylyloxy) butyl]amino}ethyl thiosulfate; M.P. 213–214° C., following successive crystallization from ethanol and from ethanol-N,N-dimethylformamide.

The 2 - {[4 - (p - tolyloxy)butyl]amino}ethyl disulfide starting material is prepared as follows. A mixture consisting of 71.7 g. of 4-(p-tolyloxy)butylamine, 20 g. of ethyl 2-mercaptoethyl carbonate, and 100 ml. of toluene is heated under reflux overnight and then distilled to give 2-{[4-(p-tolyloxy)butyl]amino}ethanethiol, B.P. 125–130° C./0.003 mm. Hg. This product is dissolved in ether, and the ethereal solution is treated with excess hydrogen chloride and cooled to give 2-{[4-(p-tolyloxy)butyl] amino}ethanethiol hydrochloride; M.P. 152–153° C., following crystallization from acetonitrile. To a stirred solution of 10 g. of this hydrochloride salt in 300 ml. of methanol is added dropwise a solution of 4.56 g. of iodine in 100 ml. of methanol until a faint yellow color persists. The resulting mixture is then treated with 90 ml. of 1 N sodium hydroxide, evaporated to remove methanol and the aqueous residue is extracted with ether. The ether extract is washed with saturated aqueous sodium chloride, dried, and treated with excess hydrogen chloride to precipitate 2-{[4-(p-tolyloxy)butyl]amino} ethyl disulfide hydrochloride; M.P. 255–262° C., following crystallization from dimethyl sulfoxide. This hydrochloride salt is dissolved in water, and the aqueous solution is made alkaline with 5% aqueous sodium hydroxide to precipitate the desired 2-{[4-(p-tolyloxy)butyl]amino} ethyl disulfide free base starting material, suitable for use without further purification.

2 - {[4 - (2,6 - xylyloxy)butyl]amino}ethanethiol, B.P. 101–108° C./0.004 mm. Hg, and the hydrochloride salt thereof, M.P. 108–110° C., are prepared similarly starting from 4-(2,6-xylyloxy)butylamine and ethyl 2-mercaptoethyl carbonate, and the hydrochloride salt is further similarly reacted with iodine and aqueous sodium hydroxide to give the 2-{[4-(2,6-xylyloxy)butyl]amino} ethyl disulfide starting material and the hydrochloride salt thereof, M.P. 174–176° C., following crystallization from ethanol-acetonitrile.

Example 4

A mixture consisting of 32.1 g. of 2-[(5-phenoxypentyl)amino]ethyl bromide hydrochloride, 27.2 g. of sodium thiosulfate pentahydrate, and 100 ml. of 25% aqueous ethanol is heated under reflux for one hour and then evaporated to give a residue of crude S-2-[(5-phenoxypentyl)amino]ethyl thiosulfate, which is isolated and crystallized successively from ethanol-N,N-dimethylformamide and from acetonitrile; M.P. 156–158° C.

The sodium salt of S-2-[(5-phenoxypentyl)amino]ethyl thiosulfalte is obtained by treating a methanolic solution of 2.0 g. of the free acid with an equivalent amount of sodium methoxide and evaporating the resulting mixture to dryness under reduced pressure.

The 2-[(5-pehnoxypentyl)amino]ethyl bromide hydrochloride starting material is prepared as follows. A mixture consisting of 17.9 g. of 5-phenoxypentylamine, 4.4 g. of ethylene oxide, and 50 ml. of methanol is heated at 45–60° C. for one hour and then evaporated to give 2-[(5-phenoxypentyl)amino]ethanol, isolated and used in the following step without further purification. This alcohol product (20.1 g.) is added at room temperature to dibromotriphenoxyphosphorane (prepared by adding 14.4 g. of bromine dropwise to 27.9 g. of chilled triphenyl phosphite tnd washing the product obtained with ether), and the resulting mixture is extracted with ether. The ether extract is washed with water, dried, and treated with excess hydrogen chloride to precipitate the desired 2-[(5-phenoxypentylamino]ethyl bromide hydrochloride starting material, suitable for use without further purification.

Example 5

A mixture consisting of 15 g. of 1-[4-(o-isopropylphenoxy)butyl]aziridine, 25.8 g. of ammonium thiosulfate, and 200 ml. of methanol, is stirred and heated under reflux for four hours, cooled, and evaporated to give a residue of S-2-{[4-(o-isopropylphenoxy)butyl]amino} ethyl thiosulfate, which is washed with water, isolated, and crystallized from aqueous ethanol; M.P. 164–167° C.

The sodium salt of S-2-{[4-(o-isopropylphenoxy)butyl]amino}ethyl thiosulfate is obtained by treating a methanolic solution of 2.0 g. of the free acid at room temperature with an equivalent amount of sodium methoxide, evaporating the resulting mixture to dryness, and crystallizing the solid salt from methanol.

Utilizing the foregoing procedure, from the reaction of 21.9 g. of 1-[4-(4-ethyl-2-methoxyphenoxy)butyl]aziridine with 18.5 g. of ammonium thiosulfate, there is obtained S-2-{[4-(4 - ethyl - 2 - methoxyphenoxy)butyl]amino}ethyl thiosulfate, which is first obtained as an oil that is purified by washing with water and crystallizing successively from ethanol-ether and ethyl acetate; M.P. 134–137° C.

The 1-[4-(o-isopropylphenoxy)butyl]aziridine starting material is prepared as follows. 4-(o-isopropylphenoxy)butyl bromide, B.P. 90–96° C./0.1 mm. Hg, is first prepared by reacting 100 g. of o-isopropylphenol with 378 g. of 1,4-dibromobutane and 102 g. of potassium carbonate in 600 ml. of acetone according to the analogous procedure described earlier herein in Example 1. A mixture consisting of 120.3 g. of 4-(o-isopropylphenoxy)butyl bromide, 189 g. of ethyleneimine, 73.3 g. of powdered potassium carbonate, and 900 ml. of absolute ethanol is heated under reflux for 51 hours, cooled, filtered, and evaporated. The residue is treated with ether, the ethereal mixture is filtered, and the filtrate is distilled to give the desired 1-[4-(o-isopropylphenoxy)butyl]aziridine starting material; B.P. 100–103° C./0.5 mm. Hg.

1-[4-(4 - ethyl - 2 - methoxyphenoxy)butyl]aziridine, B.P. 128° C./0.3 mm. Hg, is similarly prepared by first reacting 4-ethyl-2-methoxyphenol with 1,4-dibromobutane and potassium carbonate and then reacting the 4-(4-ethyl-2-methoxyphenoxy)butyl bromide product that is obtained, B.P. 128–136° C./0.5 mm. Hg, with ethyleneimine in the presence of powdered potassium carbonate.

Example 6

To a solution of 70 g. of sodium thiosulfate pentahydrate in 280 ml. of water is added 30.7 g. of 1-[5-(o-tolyloxy)pentyl]aziridine. As the resulting mixture becomes alkaline to cresol red, 1 N hydrochloric acid is slowly added to maintain neutrality. The mixture is then kept overnight at room temperature, acidified to pH 3.4 with hydrochloric acid, and the acidified solution is freeze dried. The residue is extracted with hot ethanol and the ethanolic solution is evaporated to give S-2-{[5-(o-tolyloxy)pentyl]amino}ethyl thiosulfate, which is purified by crystallizing several times from ethanol; M.P. 185–187° C.

The 1 - [5 - (o-tolyloxy)pentyl]aziridine starting material, B.P. 106–110° C./0.3 mm. Hg, is prepared by first reacting o-cresol with 1,5-dibromopentane and potassium carbonate, and then reacting the 5-(o-tolyloxy)pentyl bromide obtained, B.P. 121–137° C./0.5–0.6 mm. Hg, with ethyleneimine in the presence of potassium carbonate according to the analogous procedure described in Example 5 above.

Example 7

Thiosulfuric acid is prepared according to the following general procedure. To a stirred mixture consisting of 81.5 g. of ammonium thiosulfate and 675 ml. methanol, cooled to −40° C. under nitrogen and kept under a −78° C. condenser, is added dropwise over 30–45 minutes 48 g. of concentrated sulfuric acid, and the resulting mixture is stirred vigorously at −40° C. for 2 hours. Diethyl ether (250 ml.), previously chilled to −40° C., is then added, and the mixture is stirred at −40° C. for an additional 45 minutes, cooled to about −70° C., and vacuum-filtered. During the filtration and following steps, the filtrate is kept in a −70° C. bath. The isolated solid is washed well with cold methanol (−70° C.) and the washings are added to the cold filtrate. The total volume of the filtrate solution is noted, and the solution is kept at −40° C. or below until needed for further use.

To 69 ml. of a methanolic solution of thiosulfuric acid, freshly-prepared as described above, containing a total of 4.45 g. of thiosulfuric acid, cooled to −40° C., is added a cooled solution of 8.6 g. of 1-[4-(p-methoxyphenoxy)butyl]aziridine in 50 ml. of ether, and the resulting mixture is allowed to warm to room temperature, and then diluted with 200 ml. of ether. The diluted mixture is cooled to −20° C., and the solid S-2-{[4-(p-methoxyphenoxy)butyl]amino} ethyl thiosulfate that precipitates is isolated, dried, and crystallized from ethanol-N,N-dimethylformamide; M.P. 154–156° C.

Utilizing the foregoing procedure, the following aminoethyl thiosulfate compounds are prepared from the reaction of thiosulfuric acid with the designated aziridine compounds.

(a) From reaction with 1 - [4 - (p - propoxyphenoxy)butyl]aziridine there is obtained S-2-{[4-(p-propoxyphenoxy)butyl]amino}ethyl thiosulfate; M.P. 188–190° C., following crystallization from ethanol.

(b) From reaction with 1-[4-(2,5-xylyloxy)butyl]aziridine there is obtained S-2-{[4-(2,5-xylyloxy)butyl]amino}ethyl thiosulfate; M.P. 185–187° C.

The aziridine starting materials listed below are prepared by utilizing the procedure described earlier herein for the preparation of analogous aziridine compounds.

(1) 1 - [4 - (p-propoxyphenoxy)butyl]aziridine; B.P. 127–130° C./0.15 mm. Hg, prepared by first reacting p-propoxyphenol with 1,4-dibromobutane and potassium carbonate and then reacting the 4-(p-propoxyphenoxy)butyl bromide, B.P. 143–155° C./0.45–0.95 mm. Hg, with ethyleneimine in the presence of potassium carbonate.

(2) 1-[4-(2,5-xylyloxy)butyl]aziridine; B.P. 95–103° C./0.15–0.3 mm. Hg, prepared by first reacting 2,5-xylenol with 1,4-dibromobutane and potassium carbonate and then reacting the 4-(2,5-xylyloxy)butyl bromide product, B.P. 126–131° C./0.7 mm. Hg, with ethyleneimine in the presence of potassium carbonate.

I claim:

1. A member of the class consisting of aminoethyl thiosulfate compounds chosen from among S-2-{[4-(2,6-xylyloxy)butyl]amino}ethyl thiosulfate, S-2-{[5-(o-tolyloxy)pentyl]amino}ethyl thiosulfate, S-2-{[6-(o-tolyloxy)hexyl]amino}ethyl thiosulfate, S-2-{[4-(p-tolyloxy)butyl]amino}ethyl thiosulfate, S-2-{[4-(o - isopropylphenoxy)butyl]amino}ethyl thiosulfate, and pharmaceutically-acceptable salts of the foregoing compounds.

2. A compound according to claim 1 which is S-2-{[4-(2,6-xylyloxy)butyl]amino}ethyl thiosulfate.

3. A compound according to claim 1 which is S-2-{[5-(o-tolyloxy)pentyl]amino}ethyl thiosulfate.

4. A compound according to claim 1 which is S-2-{[6-(o-tolyloxy)hexyl]amino}ethyl thiosulfate.

5. A compound according to claim 1 which is S-2-{[4-(p-tolyloxy)butyl]amino}ethyl thiosulfate.

6. A compound according to claim 1 which is S-2-{[4-(o-isopropylphenoxy)butyl]amino}ethyl thiosulfate.

References Cited

Journal of Medicinal Chemistry, vol. 7(6), pp. 823–824.

CHARLES B. PARKER, *Primary Examiner.*

S. T. LAWRENCE III, *Assistant Examiner.*

U.S. Cl. X.R.

260—239, 570.7, 612, 613; 424—298